Patented Sept. 12, 1933

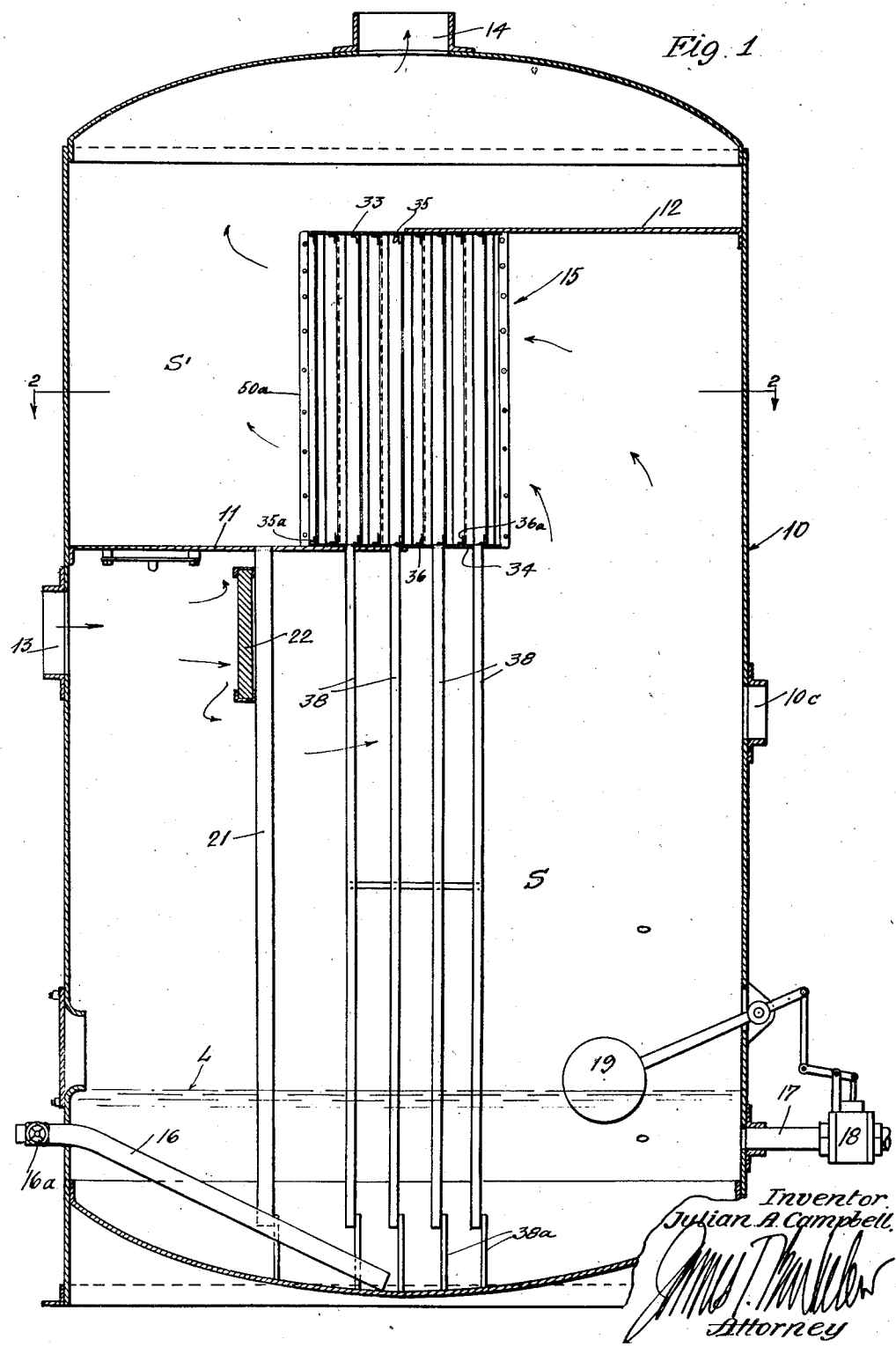

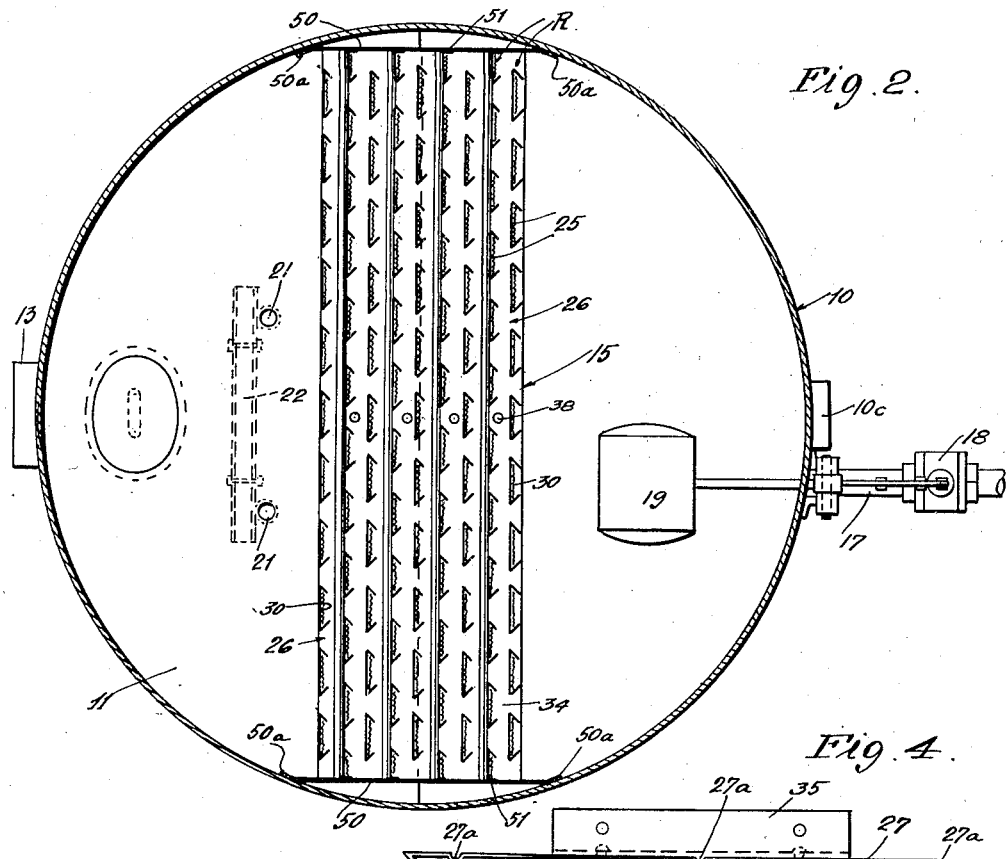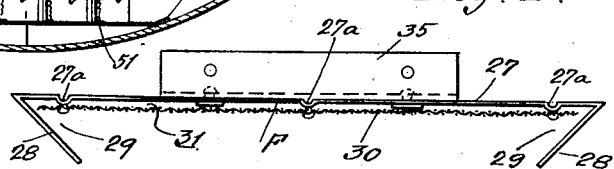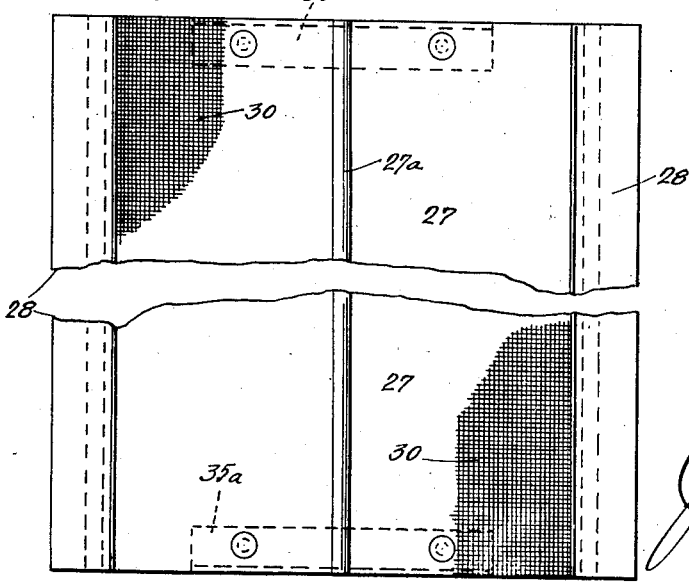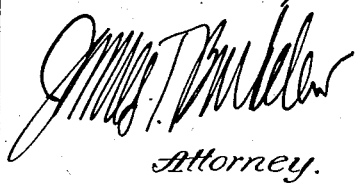

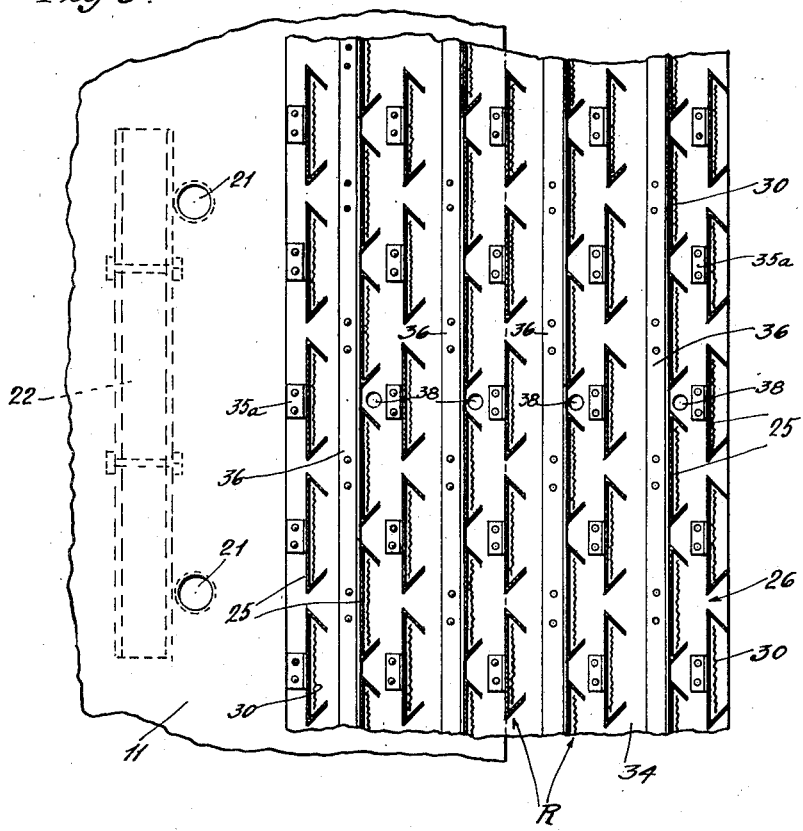

1,926,262

UNITED STATES PATENT OFFICE 1,926,262

SEPARATOR

Julian A. Campbell, Long Beach, Calif.

Application February 12, 1929. Serial No. 339,299

12 Claims. (Cl. 183—2.7)

My invention is concerned generally with separators or mist extractors for removing liquid from liquid and gaseous mixtures, and relates more particularly to separators for removing entrained crude oil from natural gas, to purify the latter prior to its subsequent treatment.

The present embodiment of the invention is particularly adapted for use in absorption systems, and for the purpose of extracting all crude oil mist and moisture from natural gas being treated in the system, before the gas is passed through the absorbers. The deleterious effects had upon absorption oil as a result of contamination by crude oil contained in the gas, such as the lowering of its absorptive capacity and thermal conductivity, and increasing its viscosity, all due to the heavier and asphaltic bodies contained in the crude, are known to those familiar with plant operation. It is commonly known, therefore, that to maintain high operating efficiency, it is essential that the untreated gas be stripped as completely as possible of its crude oil and moisture content.

It has been found that gases carrying crude oil in varying proportions from low to abnormally high amounts have been completely freed from entrainment upon passage through the separator embodied in the present invention. By way of characterizing the invention generally, it may be stated that heretofore, numerous types of separators have been devised which operate on the principle of subjecting the gas to a tortuous path of flow, as through a series of baffles, perforated plates, etc., or by throwing out the liquid particles by centrifugal action. However, such methods are objectionable to a certain extent due to the fact that the liquid bodies are caused to deposit on surfaces directly in the path of flow of the vapors, and consequently some of the liquid particles once separated are again picked up by the vapors as they sweep over the baffle surfaces.

I have overcome these objectionable features in separators having baffle plate arrangements of the general character mentioned, by constructing the individual plates or vanes in a manner such that liquid deposited on the plate assembly is retained thereon and isolated from the vapor stream, to the end that liquid particles once separated, cannot be picked up again by the vapors. In other words, the liquid bodies are removed from the direct path of the vapors as soon as they are deposited on the plate assemblies. Separators constructed in accordance with the invention have been found to be successful to the extent that in absorption systems operating on natural gas initially passed through the separators, practically no contamination of the absorption oil by crude has been noted over long periods of operation.

The above and numerous additional characteristics of the invention will be understood most readily from the following detailed description of a preferred embodiment of the invention, reference being had throughout the description to the accompanying drawings, in which:

Fig. 1 is a sectional elevation of the separators;

Fig. 2 is a horizontal section on line 2—2 of Fig. 1;

Fig. 3 is a front elevation of a single baffle plate and screen assembly comprising one of the vanes of the separator;

Fig. 4 is a plan view of Fig. 3; and

Fig. 5 is an enlarged fragmentary view illustrating the central portion of the baffle vanes as shown in Fig. 2.

It is to be understood from the outset that although I have shown the separator unit, embodying the plurality of staggered baffle vanes, to be arranged within a shell in a particular manner in the present preferred embodiment of the invention, the system of baffle vanes in itself is not necessarily limited to use in a structure of the precise characteristics shown. Therefore, I reserve the right to make use of a baffle system of the character hereinafter described, in any suitable type of body or shell construction.

Referring first to Fig. 1, the separator is seen to embody a vertically extending shell 10 having a substantially semicircular baffle floor 11 extending part way across the shell from one side thereof, and a similarly shaped upper baffle floor 12 above floor 11 and extending part way across said shell from the opposite side thereof. An inlet 13 is provided in the side of the shell below the lower floor 11 for admitting untreated gas carrying entrained particles of crude oil and moisture to the shell preferably at a point near the under side of the lower floor. A gas or vapor outlet 14 is provided in the top of the shell above the upper floor. Separating means embodying a plurality of vertically extending and staggered baffle vanes, generally indicated at 15, and arranged across the shell between floors 11, 12, serves to remove the entrained liquid particles from the gas stream fed to the shell through inlet 13, thereby causing dry gas to be discharged through outlet 14, and the separated liquids to drain to the bottom of the shell, all in a manner that will presently be described. Normally, the separated liquid is discharged from the shell by way of the liquid outlet 17, having a valve 18 controlled by float 19, the float and valve serving to maintain the liquid level L in the shell at a predetermined height. It will be noted that I have provided a comparatively large space S in the bottom of the shell in order that should a slug of oil flow into the shell along with the feed gas and thereby build up the liquid level in the base, there will be sufficient surge space for the oil to prevent its flooding the separator, and to hold the oil until it can drain through the float controlled line 17. A second discharge line 16 communicates with the lower shell interior, the inner end of this line terminating near the bottom of the shell. Valve 16a is normally closed, but when it is desired to clean the apparatus and to remove sediment from the bottom of the shell, valve 16a is opened and cleansing fluid introduced to the shell, for instance through an auxiliary opening 10c, and the mud laden fluid discharged through line 16.

In the event oil should be carried from the discharge side of the separator unit 15 onto floor 11, there is provided a pair of pipes 21 extending through the floor and serving to drain liquid therefrom to the bottom of the shell. In order to effect a preliminary separation or throwing out of the liquid particles from the vapors before the stream enters the separator unit 15, a baffle plate 22 is mounted on pipes 21 opposite the inlet 13, so that when the vapors are first introduced to the shell, they are brought to impinge on baffle 22, thereby causing some of the particles to deposit on the baffle and drop to the bottom of the shell, and also causing the vapors to suddenly change their path of flow. As indicated by the arrows in the drawings, the vapors, after being deflected from the baffle, are subjected to two complete reversals in direction of flow before they are discharged through outlet 14, this feature, in addition to the effect had by the baffle system, being effectual in causing entrained liquid to be thrown out of the gas stream.

It may be stated preliminary to a more detailed description of the separator unit 15, that the various elements or vanes embodied in this portion of the apparatus are constructed and arranged in a manner such as not only to cause the entrained liquid particles of the gas to be deposited on impinging surfaces, but to cause the liquid so deposited to be isolated and withdrawn from the path of the vapors in order that said particles may not be picked up again by the vapor stream. This effect is accomplished, generally, by two main provisions in the structure and arrangement of the baffle vanes. First, the vanes are provided with substantially integral screen portions, the effect of which in isolating the deposited liquid particles, will later be seen. And secondly, the vanes are shaped to provide catch pockets for removing liquid from the gas and arranged in staggered position relative to the normal direction of gas flow. By virtue of their shape and arrangement, the vanes, irrespective of their screen portions, present a multiplicity of vertically extending and staggered V-shaped catch pockets, and these pockets, due to their shape and positions, prevent liquid deposited therein from reentering the vapor stream and instead, cause it to drain to the base of the vanes substantially as rapidly as it is deposited.

As shown in Figs. 2 and 5, the individual vertically extending vanes 25 are laterally spaced as at 26 and alined in spaced rows R arranged substantially at right angles to the normal path of flow of the vapor, the vanes in adjacent rows being placed in relatively staggered positions. The vanes preferably are spaced sufficiently close together that the vapors are diverted in paths normal to faces F of the vane, with the result that the vapors practically reverse their paths in flowing to the next row of vanes. Each vane embodies a plate having a substantially flat back portion 27, the sides 28 of the plate being turned angularly inward toward the face F thereof against which the gases impinge, to form the V-shaped pockets 29. A screen 30 is mounted on each plate between the angularly turned sides and riveted to bead ridges 27a formed longitudinally on the plate, the screen being spaced at 31 from face F and extending substantially parallel relative thereto. Integral with the upper and lower floors are the overlapping and projecting plates 33 and 34, respectively, the vanes being secured at their upper ends to plates 33 by suitable means, as for instance angle plates 35. The lower ends of alternate rows of the vanes are similarly joined to plates 34 by means of the angles 35a. The vertical end plates 50 are arranged between plates 33 and 34, and are joined to the sides of the shell as at 50a. Thus plates 50, together with the projecting floor plates, form a box-like structure for containing the plurality of vanes, the end members of which are joined to the end plates as at 51.

In Fig. 5 it will be seen that alternate rows of the vanes are secured to plate 34 at their lower ends by means of the angle irons 36 extending continuously the length of the plate. The upturned flanges 36a of these angle irons preferably are sufficiently high to form dams between alternate rows in order to confine the liquid drained from each pair of vane rows and so prevent it from being swept along plate 34 or the lower floor 11 by the vapor stream. Drain pipes 38 extend through the floor, between the dams, and terminate at their lower ends near the bottom of the shell, and beneath the normal liquid level L in the base, feet 38a being welded to the lower ends of the drain pipes to effect their support and also aid in supporting the vane assembly. By thus providing the dams as described, liquid drained from the vanes onto the bottom plate 34 is immediately conducted to the bottom of the shell, thereby preventing its being again swept into the vapor stream. As previously mentioned, should liquid particles be carried over from the separator unit and caused to deposit on the shell about space S', or the lower floor, such liquid readily drains to the bottom of the shell through pipes 21. The operation of the system throughout is such that separated liquid bodies are immediately withdrawn to the bottom of the shell and through a path out of contact with the vapors.

In the operation of the separator, it will be noted that the path of flow of the vapors is substantially normal to the rows of baffle vanes and that the gas is first brought to impinge on the screens carried by the vanes. In the usual device of this nature embodying smooth baffles or vanes an objectionable feature exists in that liquid deposited on the baffle is allowed to drain or flow along the baffle surface in such a manner that a portion of the liquid is again picked up by eddying and turbulent flowing vapors, thereby defeating, in part, the purpose of the separator. It will be noted that the screen presents a rough surface which obviously is more effective in causing maximum precipitation of entrainment from the vapors than would result from their impinging on a smooth surface. Due to the fact that the gases are continually flowing against the outer surface of the screen, the liquid particles deposited and agglomerated thereon are caused, by virtue of the gas velocity or impact, to flow through the screen and trickle down the back side thereof, and out of the path of the vapor stream sweeping against the front or exposed side of the screen. And since there is no effective flow of the gas in space 31 between the screen and the plate that would tend to gather deposited liquid, especially since lateral flow of the vapors between the baffle vanes and screens is prevented by the bead ridges 27a, the liquid on the inner side of the screen, or any liquid that might blow through the screen and deposit on the plate, rapidly drains to the bottom of the vane. Thus the effect had by the combined plate and screen arrangement is not only to cause a high degree of separation of entrained liquid particles from the gas, but to cause the separate particles to be isolated from the gas practically as soon as they are deposited on the screen.

Similar results as regards the separation of particles deposited within the inner sides of the plates from the gas, are obtained by virtue of the pockets 29. By providing the angularly turned sides 28, the gases flowing into the pockets are caused to repeatedly reverse their direction of flow, this action, in addition to impingement on the plates, being particularly effective in throwing out the entrained liquid particles. The liquid thus separated becomes driven into the apices of the pockets, within which the liquid is more or less isolated from the vapor stream and therefore cannot be regathered by the vapors. As in the case of liquid deposited on the screens, the agglomerated particles within the pockets immediately drain to the bottom of the vanes and thence to the bottom of the separator shell.

Thus in flowing through the system of vanes, the vapors are repeatedly brought to impinge on the screens of the individual vane, and also are repeatedly caused to reverse their flow and to give up entrained particles upon flowing into the V-shaped pockets. Therefore the gases leaving separator unit, having been acted upon successively by both the agencies incorporated in the vanes, emerge completely freed of their initial liquid content. And due to the efficiency of the system in separating the liquid, substantially any quantity of entrained crude originally in the gas is removed.

It will be understood the drawings and descriptions are to be considered merely as illustrative of and not restrictive on the broader claims appended hereto, for various changes in design, structure and arrangement may be made without departing from the spirit and scope of said claims.

I claim:

1. A separator for removing oil from an oil and gaseous mixture embodying, a plurality of vertically extending vanes against which said mixture is directed, said vanes being alined and spaced apart in spaced rows arranged substantially at right angles to the normal path of flow of said mixture, the sides of the vanes being turned angularly inward toward the faces thereof against which said fluid mixture impinges, the face of each vane between said inwardly turned sides extending in substantially a single plane and screens mounted on the vanes between said angularly turned sides, said screens being spaced from the vanes and serving to separate liquid from the fluid mixture directed thereagainst, and the apertures of said screens being unobstructed and openly exposed to the impinging fluid mixture to permit free flow of separated oil therethrough.

2. In a separator for removing oil from an oil and gas mixture, a vertically extending baffle vane adapted to be arranged substantially at right angles to the normal path of flow of said mixture, and a screen mounted on the side of said vane, said screen being spaced from the vane and extending substantially parallel relative thereto the mixture being directed against the surface of said screen and the apertures of the screen being unobstructed and openly exposed to the impinging oil mixture to permit free flow of separated liquid therethrough.

3. A separator for removing oil from an oil and gaseous mixture embodying, a vertically extending shell, a baffle floor extending part way across said shell from one side thereof, an upper baffle floor above the first mentioned floor and extending part way across said shell from the opposite side thereof, an inlet in the side of the shell below the lower floor for admitting said liquid and gaseous mixture, an outlet in the shell above said upper floor, and separating means arranged between said floors and the sides of the shell, said separating means embodying a plurality of vertically extending and horizontally spaced vanes against which said mixture is directed, said vanes being joined to said floors and arranged in staggered positions relative to the normal path of flow of said mixture, screens mounted at the fluid impinging faces of said vanes and spaced therefrom, the apertures of said screens being unobstructed and openly exposed to the impinging fluid mixture to permit free flow of separated oil therethrough, and liquid seal means for draining liquid from the spaces between said vanes to the bottom of the shell.

4. A separator for removing liquid from a liquid and gaseous mixture embodying, a vertically extending shell, a baffle floor extending part way across said shell from one side thereof, an upper baffle floor above the first mentioned floor and extending part way across said shell from the opposite side thereof, an inlet in the side of the shell below the lower floor for admitting said liquid and gaseous mixture, an outlet in the shell above said upper floor, and separating means arranged between said floors and the sides of the shell, said separating means embodying a plurality of vertically extending and horizontally spaced vanes alined in spaced rows arranged substantially at right angles to the normal path of flow of said mixture, liquid from said mixture being retained on said vanes and drained to the bottom thereof, a plurality of dams between rows of said vanes, and means for draining liquid from between said dams to the bottom of the shell.

5. A separator for removing liquid from a liquid and gaseous mixture embodying, a vertically extending shell, a baffle floor extending part way across said shell from one side thereof, an upper baffle floor above the first mentioned floor and extending part way across said shell from the opposite side thereof, an inlet in the side of the shell below the lower floor for admitting said liquid and gaseous mixture, a baffle opposite said inlet and against which said mixture is directed, an outlet in the shell above said upper floor, and separating means arranged between said floors and the sides of the shell, said separating means embodying a plurality of vertically extending and horizontally spaced vanes alined in spaced rows arranged substantially at right angles to the normal path of flow of said mixture, liquid from said mixture being retained on said vanes and drained to the bottom thereof, a plurality of dams between rows of said vanes, and means for draining liquid from between said dams to the bottom of the shell.

6. In a separator for removing oil from an oil and gas mixture, a vertically extending baffle vane adapted to be arranged in the path of flow of said mixture, and an apertured wall, having closely spaced openings over substantially its entire surface, extending parallel with said vane and spaced therefrom to provide an air space between the vane and said wall, means for directing the mixture normally against the surface of said wall, the openings of the wall being unobstructed to permit free flow of liquid therethrough.

7. In a separator for removing oil from an oil and gas mixture, a vertically extending baffle vane adapted to be arranged in the path of flow of said mixture, the sides of said vanes being turned angularly inward toward the face thereof to form vertically extending V-shaped pockets, and an apertured wall having closely spaced openings over substantially its entire surface and extending parallel with the vane between said angularly turned sides, the mixture being directed against the surface of said wall and the openings of the wall being unobstructed to permit free flow of liquid therethrough.

8. A separator for removing oil from an oil and gas mixture embodying, means for directing said mixture in a predetermined path, a plurality of vertically extending and horizontally spaced imperforate vanes against which said mixture is directed, said vanes being arranged in spaced rows and said rows and the vanes being substantially normal to the path of flow of said mixture, and screens mounted at and substantially parallel with the faces of said vanes, the fluid mixture impinging directly against said screens, said screens being spaced from the vanes and serving to separate oil from the mixture directed thereagainst, and the apertures of said screens being unobstructed and openly exposed to the impinging fluid mixture to permit free flow of separated oil therethrough.

9. In a separator for removing oil from an oil and gas mixture, a vertically extending baffle vane adapted to be arranged substantially at right angles to the normal path of flow of said mixture, the side of said vane being turned angularly inward toward the face thereof, to form vertically extending pockets, and a screen mounted on the vane between said angularly turned sides, said screen being spaced from the vane and extending substantially parallel relative thereto, means for supporting said vane exclusively at its upper and lower ends, the mixture being directed against the surface of said screen and the apertures of the screen being unobstructed and openly exposed to the impinging fluid mixture to permit free flow of separated oil therethrough.

10. A separator for removing oil from an oil and gaseous mixture embodying, a vertically extending shell, a baffle floor extending part way across said shell from one side thereof, an upper baffle floor above the first mentioned floor and extending part way across said shell from the opposite side thereof, an inlet in the side of the shell below the lower floor for admitting said oil and gaseous mixture, an outlet in the shell above said upper floor, separating means embodying a vane and a screen spaced from said vane, arranged between said floors for removing oil from said mixture, means for supporting said vane exclusively at its upper and lower ends, and liquid seal means for draining the separated oil to the bottom of said shell, the mixture being directed against the surface of said screen and the apertures of the screen being unobstructed and openly exposed to the impinging fluid mixture to permit free flow of separated oil therethrough.

11. A separator for removing oil from an oil and gas mixture embodying, a vertically extending shell, an inlet for said oil and gas mixture, an outlet, the bottom of said shell containing a body of separated oil, and a separator within the shell above said inlet and between said inlet and outlet, said separator embodying a baffle vane arranged in the path of flow of said mixture, and an apertured wall having closely spaced apertures over substantially its entire surface and extending parallel with and spaced from the face of said vane, said apertures being unobstructed and openly exposed to the fluid mixture to permit free flow of separated oil therethrough, and liquid seal means for conducting separated liquid from the space between said vane and apertured wall to said body of oil in the bottom of the shell.

12. A separator for removing oil from an oil and gaseous mixture embodying, a vertically extending shell, an inlet for said oil and gas mixture, an outlet, the bottom of said shell containing a body of separated oil, and a separator within the shell above said inlet and between said inlet and outlet, said separator embodying a baffle vane arranged in the path of flow of said mixture, and an apertured wall having closely spaced apertures over substantially its entire surface and extending parallel with and spaced from the face of said vane, said apertures being unobstructed and openly exposed to said fluid mixture to permit free flow of separated oil therethrough, and means for conducting separated oil from the space between said vane and apertured wall to said body of oil in the bottom of the shell and through a path out of contact with the fluid mixture introduced thereto.

JULIAN A. CAMPBELL.

CERTIFICATE OF CORRECTION.

Patent No. 1,926,262.                                                      September 12, 1933.

JULIAN A. CAMPBELL.

It is hereby certified that error appears in the printed specification of the above numbered patent requiring correction as follows: Page 3, line 95, claim 2, after "thereto" insert a comma; line 98, for "oil" read fluid; and line 99, for "liquid" read oil; and that the said Letters Patent should be read with these corrections therein that the same may conform to the record of the case in the Patent Office.

Signed and sealed this 21st day of November, A. D. 1933.

(Seal)                                                                          F. M. Hopkins
                                                                                     Acting Commissioner of Patents.